Jan. 19, 1965

D. ODAWARA 3,166,056

SUPERCHARGER FOR AN INTERNAL COMBUSTION ENGINE

Filed Jan. 30, 1964

INVENTOR.
DAISAKU ODAWARA
BY
*H. A. Freedman*
ATTORNEY 3,166,056
SUPERCHARGER FOR AN INTERNAL
COMBUSTION ENGINE
Daisaku Odawara, 520–5 cho, Uenoshiba-cho,
Sakai, Japan
Filed Jan. 30, 1964, Ser. No. 341,259
1 Claim. (Cl. 123—79)

This invention relates to a supercharger for an internal combustion engine, and particularly to an engine construction whereby the intake and exhaust cycles of the engine are more effective and efficient. The maximum output of an internal combustion engine is determined by air consumption in the combustion chamber during a unit of time; also by mechanical and thermal stresses. In most cases the engine is reduced in efficiency and horsepower by a shortage of air. In present types of engines the additional required air for combustion in the engine is supplied by a mechanical supercharger unit, which is a separate entity from the engine itself.

An object of my invention is to change the construction of the internal combustion engine whereby efficiency of the intake and exhaust strokes of a 4-cycle engine are increased in efficiency to thereby increase the power output of the engine. In conventional engines the intake and exhaust valves are separate units and are timed independently and function independently. In my engine construction both the intake and exhaust valves are simultaneously operated on both the intake and exhaust strokes of the piston. During the power stroke of the piston both intake and exhaust valves are closed to prevent pressure leakage.

Still another object of my invention is to connect the intake and exhaust passages in the engine head so that there is a common passage between them, and both the exhaust and intake passages are provided with separate sealing valve structures which are separately and individually timed.

Other objects, advantages and features of invention may appear from the accompanying drawing, the subjoined detailed description and the appended claims.

Figure 1:
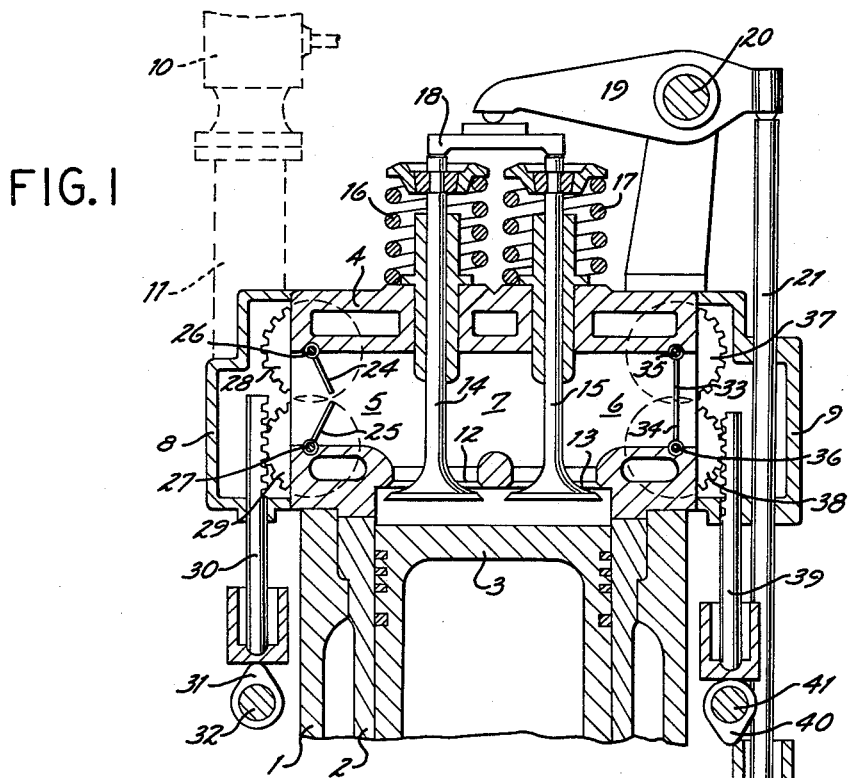
FIGURE 1 is a fragmentary longitudinal sectional view of an engine embodying my construction and showing the piston at the beginning of the intake stroke.

Referring more particularly to the drawing, the numeral 1 indicates the cylinder casting and 2 a cylinder liner within that casting. A piston 3 is reciprocally mounted in the cylinder casting 2, all of which is usual and well known in the art. The cylinder 3 is connected to the usual crankshaft by means of the usual crank, not shown, but which is usual in 4-cycle internal combustion engines. A cylinder head 4 is mounted on the cylinder casting 1 and this head is provided with an intake passage 5 and an exhaust passage 6, which passages are interconnected or open to each other by the central passage 7; thus the passages 5, 6 and 7 are continuous openings from one side of the head 4 to the other. The intake passage 5 opens into an intake manifold 8 and the exhaust passage 6 is connected to the exhaust manifold 9. The usual carburetor 10 is connected to the intake manifold 8 by the fuel intake pipe 11, all of which is usual and well known in this art.

The cylinder head 4 is provided with two valve ports 12 and 13, both of which open into the top of the cylinder liner 2, which may also be termed the cylinder, and these two valves are placed in rather close proximity to each other and these valve ports both serve as the intake and the exhaust valves. A valve 14 is mounted in the valve passage 12, and a valve 15 is mounted in the valve passage 13. These valves are urged to a closed or seated position by the coil springs 16–17 respectively in the usual and well known manner. The valves 14 and 15 are both engaged at their upper ends by a single actuating bar 18 which extends horizontally between these valves. The actuating bar 18 is engaged and operated by the rocker arm 19 which is journaled on a shaft 20. The rocker arm 19, in turn, is rocked or partially rotated by the push rod 21 which is operated by the cam 22 on the cam shaft 23. This method of controlling the opening and closing of an overhead valve is common practice in some types of internal combustion engines. However, in this instance both valves 14 and 15 are simultaneously opened and closed by a single rocker arm which engages a bridging or connecting bar 18 engaging both of the valves, thus providing a much larger intake and exhaust area through which gases can move during both the intake and exhaust strokes of the piston 3.

To provide the proper flow of gases on both the intake and exhaust strokes of the piston 3, I provide separate valve structures in both passages 5 and 6, these valves being separately timed and separately actuated as follows: Considering first the valve structure on the intake stroke of the piston 3, as shown in FIGURE 1. A pair of flap valves 24–25 are attached to shafts 26–27 respectively. These flap valves are mounted in the intake passage 5 and control fuel vapors from the intake manifold 8. A pair of meshing gears 28–29 are attached to the shafts 26–27 respectively, and these meshing gears cause the shafts to rotate and to open and close the flap valves 24–25 by a rack 30 which engages the gear 29. The rack 30 is reciprocated by the cam 31 on the shaft 32 and is also timed by this same means. Thus it will be evident that the flap valves 24–25 are moved in timed relation to the rotation of the shaft 32 which is timed with the movement of the piston 3, all of which is usual and well known in internal combustion engines.

Figure 2:
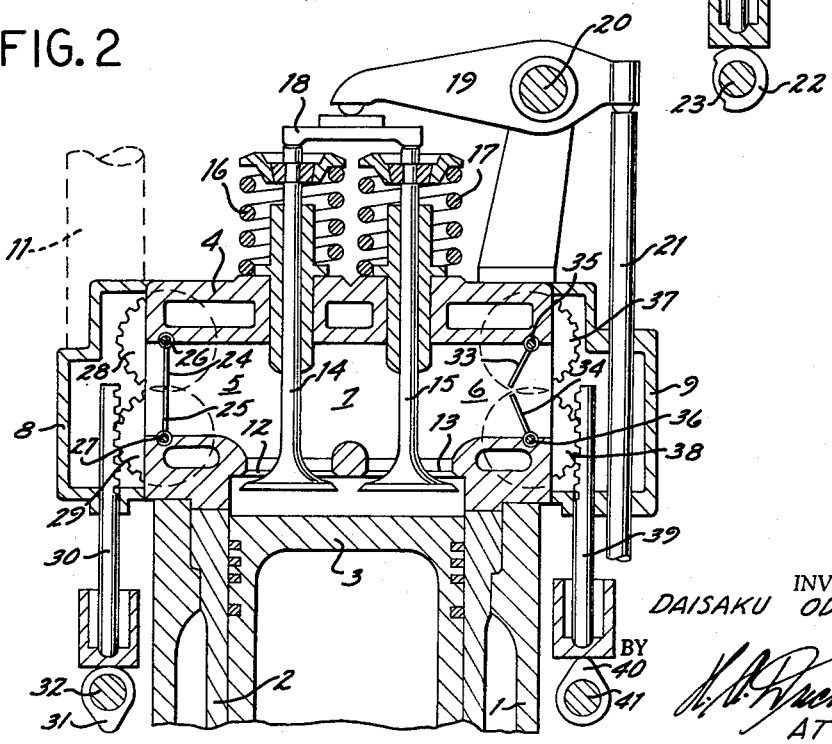
FIGURE 2 is a fragmentary longitudinal sectional view of my engine showing the piston at the end of the exhaust stroke.

The exhaust passage 6 is opened and closed to the movement of gases therethrough in an identical manner to the valve in the intake passage 5, that is, there are two co-acting flap valves 33–34 which are mounted on shafts 35–36 respectively. These shafts, in turn, are partly rotated by means of meshing gears 37–38 which are attached thereto. The gear 38 is motivated by the rack 39 which is actuated by the cam 40 on the shaft 41. Thus it will be evident that the flap valves 33–34 are opened and closed in timed relation to the movement of the piston 3; that is, they are open on the exhaust stroke, as shown in FIGURE 2, and are closed on the remaining strokes of the piston in a 4-cycle type of engine.

*In operation*

Assuming first that the piston 3 is on its downward or intake stroke. The flap valves 24–25 will be moved to open position by rack 30 rotating the meshing gears 28–29, and at this time both valves 14 and 15 are open since the rocker arm 19 is depressing the common bar or bridge 18. The flow of incoming fuel gas, which is fuel and air, will pass through both valves 14 and 15, thus more effectively filling the combustion chamber above the piston 3. During the compression and firing strokes, both valves 14 and 15 will be closed, all of which is usual and well known in 4-cycle engines. On the upward exhaust stroke of the piston 3 both valves 14 and 15 will again be simultaneously opened by the rocker arm 19, and at the same time the flap valves 33–34 will open. The flap valves 24–25 during this cycle will be closed. Again the exhaust gases can move through both the valve ports 12–13 and will have a large area from the outflowing gases, that is, the passages 5, 6 and 7. The exhaust gases can now pass freely into the exhaust manifold 9 and, as a result, the combustion chamber above the piston 3 is more effectively evacuated.

Having described my invention, I claim:

In an internal combustion engine comprising a cylinder casting having a cylinder therein, a piston in the cylinder and a cylinder head,
- a pair of valves in said head, said valves serving as both intake and exhaust for the cylinder,
- cam operated means to simultaneously actuate both of said valves simultaneously,
- said head having an intake port therein extending to the valve,
- said cylinder having an exhaust port extending to the valve,
- said cylinder having a passage therein connecting the intake and exhaust ports,
- a pair of flap valves positioned in the intake port to close the intake port in one position of the valves, a pair of meshing gears attached to said flap valves,
- a rack engaging one of the meshing gears, cam means engaging the rack to reciprocate the same,
- another pair of flap valves mounted in the exhaust port, a pair of meshing gears attached to the last named flap valves, a rack engaging one of the last named meshing gears, and cam means engaging the last named rack to reciprocate the same.

References Cited by the Examiner
UNITED STATES PATENTS

| | | | |
|---|---|---|---|
| 1,304,735 | 5/19 | Blumberg | 123—79 |
| 1,397,585 | 11/21 | James | 123—79 |
| 1,405,235 | 1/22 | Levin | 123—79 |
| 1,690,384 | 11/28 | Trego | 123—79 |
| 1,992,721 | 2/35 | Smith | 123—79 |
| 2,215,579 | 9/40 | Eichelberg. | |

FRED E. ENGELTHALER, *Primary Examiner.*